(12) United States Patent
Takahashi et al.

(10) Patent No.: US 9,416,533 B2
(45) Date of Patent: Aug. 16, 2016

(54) DAMPING DEVICE AND VIBRATION CONTROL APPARATUS FOR STRUCTURE

(71) Applicants: KOZO KEIKAKU ENGINEERING INC., Nakano-ku, Tokyo (JP); SANWA TEKKI CORPORATION, Shinagawa-ku, Tokyo (JP)

(72) Inventors: Osamu Takahashi, Tokyo (JP); Tetsuya Tomizawa, Tokyo (JP); Kazuhiko Shibata, Tokyo (JP); Yusuke Sato, Tokyo (JP)

( * ) Notice: Subject to any disclaimer, the term of this patent is extended or adjusted under 35 U.S.C. 154(b) by 0 days.

(21) Appl. No.: 14/758,499

(22) PCT Filed: Dec. 27, 2013

(86) PCT No.: PCT/JP2013/085144
§ 371 (c)(1),
(2) Date: Jun. 29, 2015

(87) PCT Pub. No.: WO2014/104313
PCT Pub. Date: Jul. 3, 2014

(65) Prior Publication Data
US 2015/0345134 A1    Dec. 3, 2015

(30) Foreign Application Priority Data
Dec. 27, 2012    (JP) ................. 2012-285165

(51) Int. Cl.
*F16F 15/03*    (2006.01)
*E04B 1/98*    (2006.01)
(Continued)

(52) U.S. Cl.
CPC ............. *E04B 1/985* (2013.01); *F16F 9/535* (2013.01); *F16F 15/027* (2013.01); *F16F 15/03* (2013.01); *F16F 15/30* (2013.01); *E04H 9/028* (2013.01); *F16F 2232/06* (2013.01)

(58) Field of Classification Search
CPC ............. E04H 9/02; F16F 15/02; F16F 15/03; F16F 9/53; F16F 15/023; F16F 9/50; B60G 17/08; B60G 15/06; B60G 17/06; F16H 25/22
USPC ................... 188/129, 134, 267, 299.1
See application file for complete search history.

(56) References Cited

U.S. PATENT DOCUMENTS

| | | | | |
|---|---|---|---|---|
| 4,776,437 A | * | 10/1988 | Ishibashi | F16F 9/462 188/266.4 |
| 2002/0074881 A1 | * | 6/2002 | Imlach | F16C 27/06 310/90.5 |

(Continued)

FOREIGN PATENT DOCUMENTS

| | | |
|---|---|---|
| JP | 10-184757 A | 7/1998 |
| JP | 2002-168283 A | 6/2002 |

(Continued)

OTHER PUBLICATIONS

IPEA/JP JPO, International Preliminary Report on Patentability in International Application No. PCT/JP2013/085144, issued on Dec. 19, 2014 total 10 pages with English translation.

*Primary Examiner* — Christopher Schwartz
(74) *Attorney, Agent, or Firm* — Masuvalley & Partners

(57) ABSTRACT

A device for damping a transmitted vibration by the moment of inertia of a fly wheel and the adjustable resistance force of a viscous magnetic fluid to allow the viscous magnetic fluid exerts its property even under no external power source. A sleeve with an attached ball nut is disposed in a first cylinder so as to reciprocate. The reciprocating motion of the sleeve is converted into a rotational motion by a ball screw to rotate a fly wheel in a second cylinder and a generator rotating shaft. Between the fly wheel and the inner surface of the second cylinder, a sealed space is formed in which a viscous magnetic fluid is sealed. A magnetic field generating unit which generates a magnetic field running across the sealed space with the fly wheel serving as a part of a magnetic circuit is disposed on the inner circumference of the second cylinder.

24 Claims, 7 Drawing Sheets

(51) Int. Cl.
*F16F 15/30* (2006.01)
*F16F 15/027* (2006.01)
*F16F 9/53* (2006.01)
*E04H 9/02* (2006.01)

(56) References Cited

U.S. PATENT DOCUMENTS

2009/0095584 A1* 4/2009 Kondo .................. B60G 11/15
188/267
2010/0200343 A1* 8/2010 Kondo .................. B60G 13/02
188/267

FOREIGN PATENT DOCUMENTS

| JP | 2005-180492 A | 7/2005 |
| JP | 2005-256888 A | 9/2005 |
| JP | 2010-242971 A | 10/2010 |
| JP | 2011-106519 A | 6/2011 |
| JP | 2012-184816 A | 9/2012 |

* cited by examiner

DAMPING DEVICE AND VIBRATION CONTROL APPARATUS FOR STRUCTURE

RELATED APPLICATIONS

This application is the U.S. National Phase of and claims priority to International Patent Application No. PCT/JP2013/085144, International Filing Date Dec. 27, 2013, entitled Damping Device and Vibration Control Apparatus For Structure, which claims benefit of Japanese Patent Application No. 2012-285165 filed Dec. 27, 2012; both of which are incorporated herein by reference in their entireties.

TECHNICAL FIELD

The present invention relates to a damping device and a vibration control apparatus for a structure, specifically, a damping device using the moment of inertia of a fly wheel rotated by a ball screw and a ball nut that convert a linear motion into a rotational motion and the viscous resistance of a viscous magnetic fluid, and a vibration control apparatus for a structure using the damping device.

BACKGROUND ART

Vibration control apparatuses using inertia of an object are proposed as an apparatus to suppress transmission of vibration in a building structure or various mechanical apparatuses. Such vibration control apparatuses include an apparatus employing a mechanism for converting a linear motion into a rotational motion of a fly wheel to use the moment of inertia of the rotating fly wheel for vibration control so that the apparatus can be downsized.

Patent Literature 1 and Patent Literature 2 disclose apparatuses configured to convert a linear motion into a rotational motion using a ball screw and a ball nut to rotate a fly wheel disposed in a case and to include a viscous body, such as a synthetic rubber, disposed between the fly wheel and the case (see paragraph 0060, FIG. 6).

In such vibration control apparatus, a slight translational motion is amplified with the combination of the ball screw and the ball nut to rotate the fly wheel at a high speed, and the moment of inertia of the fly wheel and the viscous resistance produced between the fly wheel and the case can be used for vibration control.

A damping device which uses the viscosity and friction of a viscous magnetic fluid (MR fluid) for damping is proposed. Patent Literature 3 discloses a vibration control apparatus that uses a viscous magnetic fluid. FIG. 13 is a cross-sectional view illustrating a schematic configuration of a conventional damping device. The damping device 210 includes a cylinder 212 filled with a viscous magnetic fluid 211, a piston rod 213 inserted into the cylinder 212 and supported in the cylinder 212 so as to axially reciprocate, a piston 214 fixed at a suitable location in the middle of the piston rod 213 to partition the inside of the cylinder 212, a bypass tube 215 provided in the lower part of the cylinder 212, and a magnetic field generating unit 216, such as an electromagnet, disposed along the axial direction of the bypass tube 215. Attachment units 212a and 213a are provided on an end of the cylinder 212 and an end of the piston rod 213, respectively. The attachment units are attached, for example, to different portions of a building structure.

When a building is vibrated by, for example, an earthquake, the piston 214 moves in the cylinder along the axial direction to force the viscous magnetic fluid 211 to flow in the bypass tube 215. Under the effect of the magnetic field generated by the magnetic field generating unit 216, magnetic particles in the viscous magnetic fluid 211 form a chain-like structure to provide resistance in the flow of the viscous magnetic fluid 211 to damp the vibration.

According to the damping device 210, by controlling the current supplied to the electromagnet, which is the magnetic field generating unit, the damping property of the viscous magnetic fluid 211 can be adjusted to change the damping property of the damping device 210.

CITATION LIST

Patent Literature

Patent Literature 1: Japanese Patent Application Laid-Open No. 2005-180492
Patent Literature 2: Japanese Patent Application Laid-Open No. 2002-168283
Patent Literature 3: Japanese Patent Application Laid-Open No. 10-184757

SUMMARY OF INVENTION

Technical Problem

Although the vibration control apparatuses disclosed in Patent Literature 1 and Patent Literature 2 suppress the transmission of a vibrational force from a vibration source and the resonance amplitude by a rotational moment and viscous resistance to facilitate the damping of the vibration, however, the damping properties of the vibration control apparatuses are constant. Thus, it is difficult for such vibration control apparatus to exert an effective damping property by flexibly responding to earthquakes which have various vibration properties, and a complex behavior of a building.

In addition, the damping device disclosed in Patent literature 3 requires an external power source to supply electric power to the electromagnet, which is a magnetic field generating unit. This is disadvantageous in that when the external power source is lost by a disaster or an accident, the magnetic field cannot be generated, and the effect of facilitating the damping of vibration by using the viscous magnetic fluid is greatly deteriorated.

The present invention is made in view of the problem described above. The object of the present invention is to provide a small-sized damping device which is configured to damp a transmitted vibration by the moment of inertia of a fly wheel and the adjustable resistance force of a viscous magnetic fluid and allows the viscous magnetic fluid to perform under no external power source.

Solution to Problem

In order to solve the above problem, the present invention according to first aspect is a damping device including: a casing having a first cylinder and a hollow second cylinder, where the first cylinder includes an axial through hole having a distal opening at a distal end and a communication opening at the other end, the second cylinder is coaxially fixed to the other end of the first cylinder with an opening at one end of the second cylinder communicating with the communication opening, and the other end of the second cylinder is plugged; a hollow sleeve engaging in the distal opening of the first cylinder to be supported in the axial through hole so as to reciprocate along the axial direction without rotating; a ball nut fixed inside the sleeve; a ball screw screwed in an internal thread of the ball nut; a fly wheel made of a ferromagnetic material, rotatably disposed in the hollow of the second cylinder, and coaxially fixed to the ball screw to be rotatably driven; a sealing member forming a sealed space in a gap between an inner wall of the second cylinder and an outer circumference of the fly wheel; a magnetic field generating unit disposed on the inner wall of the second cylinder and including an electromagnet generating a magnetic field running across the sealed space with the fly wheel serving as a part of a magnetic circuit; a viscous magnetic fluid sealed in the sealed space; a generator including a rotor part integrally rotating with the fly wheel and a stator part disposed concentrically with the rotor part, where the rotor part is configured with a field magnet or an armature and the stator part is configured with an armature or a field magnet; and a storage battery for storing an electric power generated by the generator, wherein when the amount of the electric power generated by the generator is below a certain threshold value, the electric power generated by the generator is stored to the storage battery, when the amount of the electric power generated by the generator is of a certain threshold value or above, the electric power generated by the generator is supplied to the electromagnet.

The invention according to second aspect is a damping device including: a casing including a first cylinder and a hollow second cylinder, the first cylinder having an axial through hole having a distal opening at a distal end and a communication opening at the other end, the second cylinder being coaxially fixed to the other end of the first cylinder with an opening at one end of the second cylinder communicating with the communication opening, the other end of the second cylinder being plugged; a hollow sleeve engaging in the distal opening of the first cylinder to be supported in the axial through hole so as to reciprocate along an axial direction without rotating; a ball screw fixed inside the sleeve; a ball nut screwed on an external thread of the ball screw; a fly wheel made of a ferromagnetic material, rotatably disposed in a hollow of the second cylinder, and coaxially fixed to the ball nut to be rotatably driven; a sealing member forming a sealed space in a gap between an inner wall of the second cylinder and an outer circumference of the fly wheel; a magnetic field generating unit disposed on the inner wall of the second cylinder and including an electromagnet configured to generate a magnetic field running across the sealed space with the fly wheel serving as a part of a magnetic circuit; a viscous magnetic fluid sealed in the sealed space; a generator including a rotor part configured to integrally rotate with the fly wheel and a stator part disposed concentrically with the rotor part, the rotor part being configured with a field magnet or an armature, the stator part being configured with an armature or a field magnet; and a storage battery for storing an electric power generated by the generator, wherein when the amount of the electric power generated by the generator is below a certain threshold value, the electric power generated by the generator is stored to the storage battery, when the amount of the electric power generated by the generator is of a certain threshold value or above, the electric power generated by the generator is supplied to the electromagnet.

In the damping devices disclosed in first aspect and second aspect, the ball nut and the ball screw convert a linear motion of the sleeve produced by vibration into a rotational motion to rotate the fly wheel at high speed. The generator generates power using the rotational motion. The viscous magnetic fluid provided in the sealed space between the outer circumference of the fly wheel and the inner wall of the second cylinder gains viscosity by the magnetic field running across the sealed space generated by the magnetic field generating unit with the fly wheel serving as a part of the magnetic circuit. Thus, in the damping device, the vibration is damped by the moment of inertia of the fly wheel and the viscous resistance of the viscous magnetic fluid acting on the fly wheel.

The magnitude of the magnetic field, or the resistance of the viscous magnetic fluid, can be adjusted by the supply of the electric power generated by the generator to the electromagnet of the magnetic field generating unit. The magnetic field is generated, with the ferromagnetic fly wheel serving as a part of the magnetic circuit, to run across the sealed space. Thus, the magnetic particle in the viscous magnetic fluid in the sealed space forms a chain-like structure between the fly wheel and the second cylinder, and the magnetic particle forming the chain-like structure is sheared by the rotating fly wheel, thereby producing viscous resistance acting on the fly wheel.

The invention according to third and fourteenth aspects includes the other end of the second cylinder and the sleeve include coupling parts which are coupled to external members. According to the present invention, when installing the damping device in a structure, a structural member constituting the structure can easily be attached to the damping device to control the vibration of the structure.

The invention according to fourth and fifteenth aspects includes the magnetic field generating unit includes a permanent magnet. The present invention is configured such that, by controlling the current impressed on an electromagnet, the viscosity of the viscous magnetic fluid can be adjusted and thereby the strength of the resistance force acting on the fly wheel can be controlled. Thus, the damping property of the damping device can be optimized for the vibration property and an object of which vibration is to be controlled, and the magnetic particles in the viscous magnetic fluid always form a chain-like structure by the effect of the permanent magnet, thereby preventing the depositing thereof.

The invention according to fifth and sixteenth aspects includes the magnetic field generating unit generates a magnetic field running across the sealed space with the second cylinder serving as a part of a magnetic circuit in the damping device. The present invention is configured such that the magnetic field generating unit can use the second cylinder as a part of the magnetic circuit, so that the number of component members for generating the magnetic field can be reduced and thus the magnetic field generating unit can be configured simple.

The invention according to sixth and seventeenth aspects includes a dimension of the sealed space between the inner wall of the second cylinder and an outer circumferential surface of the fly wheel is suitable for preventing settling of a viscous magnetic fluid by stirring the sealed viscous magnetic fluid with the fly wheel rotated by a steady vibration of the damping device being used. According to the present invention, for the damping device installed in a structure, a steady vibration of the structure under a normal state rotates the fly wheel to prevent the viscous magnetic fluid from settling, so that the damping device can exert its predetermined property under a sudden excitation.

The invention according to seventh and eighteenth aspects includes a control unit for adjusting a magnetic force of the magnetic field generating unit. According to the present invention, the control unit adjusts the magnetic force of the magnetic field generating unit to change the resistance force of the viscous magnetic fluid acting on the fly wheel, thereby adjusting the property of the damping device to provide an appropriate damping property of the damping device for the vibration property and an object of which vibration is to be controlled.

The invention according to eighth and nineteenth aspects includes a storage battery for storing electric power generated by the generator. According to the present invention, an electric power to adjust the magnetic force of the magnetic field generating unit is also supplied from a storage battery, so that the vibration can be damped quickly regardless of the power-generating capacity of the generator.

The invention according to ninth and twentieth aspects is a vibration control apparatus for a structure includes a damping device installed between structural members of a structure and a control unit for adjusting the magnetic force of a magnetic field generating unit of the damping device. According to the present invention, the control unit adjusts the magnetic force of the magnetic field generating unit to change the resistance force of the viscous magnetic fluid acting on the fly wheel, thereby adjusting the property of the damping device to provide an appropriate property for the structure and the vibration property of the structure.

The invention according to tenth and twenty first aspects includes an accelerometer mounted on a structural member of the building structure to detect the vibrational state of the structural member and in that the control unit controls the magnetic field generating unit according to a value detected by the accelerometer. According to the present invention, the control unit controls the magnetic field generating unit of the damping device to perform an optimum damping force for damping the vibration of the structural member detected by the accelerometer, thereby effectively damping the vibration of the structure.

The invention according to eleventh and twenty second aspects includes the accelerometer is mounted corresponding to the damping device, and the control unit performs control according to a value detected by the accelerometer corresponding to the magnetic field generating unit of the damping device. According to the present invention, the control unit can perform optimum control for each damping device according to the value detected by the accelerometer corresponding to each damping device to effectively damp the vibration of the structure.

The invention according to twelfth and twenty third aspects includes the control unit controls the damping device according to external information on earthquake. According to the present invention, the damping device can be operated based on external information on earthquake, so that the structure can be prepared to damp the vibration before the arrival of seismic waves, and an effective damping effect against an initial vibration can be provided.

The invention according to thirteenth and twenty fourth aspects include the control unit periodically operates the magnetic field generating unit of the damping device to generate a magnetic field in the sealed space. According to the present invention, the control unit periodically operates the magnetic field generating unit to form a chain-like structure of the magnetic particles in the viscous magnetic fluid, thereby preventing the magnetic particles from depositing. The invention according to twenty fifth and twenty sixth aspects include a utility power source for supplying electric power to the electromagnet; wherein when the utility power source is stopped, the electric power generated by the generator is supplied to the electromagnet.

Advantageous Effects of Invention

A small-sized damping device according to the present invention is configured to damp an externally transmitted vibration with a desirable property by the moment of inertia of a fly wheel and the adjustable resistance force of a viscous magnetic fluid and to allow the viscous magnetic fluid to exert a predetermined function under no external power source.

Furthermore, the vibration control apparatus for a structure according to the present invention is configured such that the damping property of the damping device installed in a structure can be adjusted on a real-time basis according to the property of the structure and the property of excitation so as to effectively control the vibration in a manner suitable for the structure and the property of excitation.

DESCRIPTION OF EMBODIMENTS

Figures 1, 2:
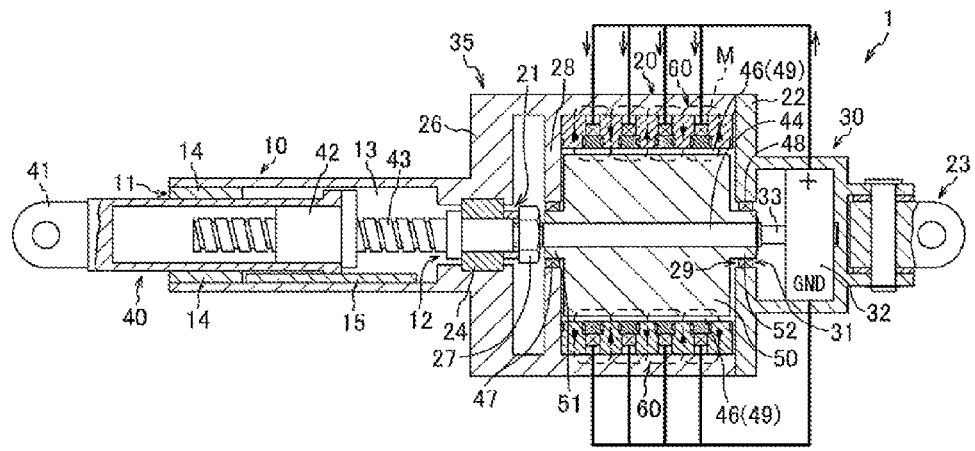
FIG. 1 is a cross-sectional view of a damping device according to one embodiment of the present invention.
FIG. 2 is a perspective view illustrating a portion cut out of the damping device in FIG. 1.

A damping device according to an embodiment will be described referring to the drawings. The present invention is not limited to several exemplary embodiments described below, and various modifications, alterations, variations, and substitutions can be made without departing from the spirit and scope of claims.

FIG. 1 is a cross-sectional view of a damping device according to one embodiment of the present invention. FIG. 2 is a perspective view of the same damping device with a portion cut out in the illustration.

Schematically, the damping device 1 includes a casing 35 configured with a first cylinder 10, a second cylinder 20, and a third cylinder 30, a sleeve 40 disposed in the first cylinder 10, a fly wheel 50 disposed in the second cylinder 20, a magnetic field generating unit 60 disposed in the second cylinder 20, and a generator 32 disposed in the third cylinder 30.

The first cylinder 10 is a cylindrical member including an axial through hole 13 with a distal opening 11 at the distal end (left side in FIG. 1) and a communication opening 12 at the other end (right side in FIG. 1). The second cylinder 20 is a hollow member coaxially fixed to the other end of the first cylinder 10 with an opening 21 provided at one end of the second cylinder 20 communicating with the communication opening 12 of the first cylinder 10. The second cylinder 20 has at the other end thereof a communication opening 29. The third cylinder 30 is a hollow member coaxially fixed to the other end of the second cylinder 20 with an opening 31 provided at one end of the third cylinder 30 communicating with the communication opening 29 of the second cylinder 20. A cover member 22 is provided at the other end of the third cylinder 30. A universal joint 23 which is coupled to a structure in which the damping device 1 is installed is attached to the cover member 22. For example, the casing 35 is integrally configured with steel.

A hollow sleeve 40 is disposed in the axial through hole 13 of the first cylinder 10 so as to reciprocate along the axial direction, with the distal end thereof protruding from the distal opening 11. The sleeve 40 is supported in the axial through hole 13 of the first cylinder 10 so as to reciprocate along the axial direction without rotating. More specifically, the outer circumferential surface of the sleeve 40 is held by a bushing 14 disposed in the first cylinder 10 so that the sleeve can reciprocate in the first cylinder 10 along the axial direction, and a key 15 supports the sleeve 40 not to rotate.

An attachment member 41 is fixed on the distal end (left side in the drawing) of the sleeve 40 to couple with a structure in which the damping device 1 is installed. A ball nut 42 is fixed inside the other end (right side in the drawing) of the sleeve 40. A ball screw 43 is inserted through the ball nut 42, screwed with the internal thread of the ball nut 42. When the first cylinder 10 and the sleeve 40 relatively moves along the axial direction by a vibration or an impact transmitted from the structure in which the damping device 1 is installed, the ball screw 43 and the ball nut 42 have a function to convert the linear motion into a rotational motion of the ball screw 43 with high efficiency.

A rotating shaft member 44 is coaxially connected to the other end of the ball screw 43. The rotating shaft member 44 extends inside the second cylinder 20 and is rotatably supported by a bearing 24 disposed in the inner circumference of the end flange 26 (a boundary between the first cylinder 10) of the second cylinder 20.

The axial portion of the fly wheel 50 is fixed to the rotating shaft member 44. The fly wheel 50 thus rotates in the second cylinder 20 integrally with the rotation of the ball screw 43. The fly wheel 50 is a pillar-shaped member having reduced diameter end portions 51 and 52 at both ends, and is made of a ferromagnetic material, such as steel. The damping device 1 damps the vibration transmitted between the universal joint 23 and the attachment member 41 by using the moment of inertia of the fly wheel 50. A nut 27 illustrated in FIG. 1 is provided to assemble the fly wheel 50.

A sealed space 46 is formed in a gap between the inner wall of the second cylinder 20 and the outer circumference of the fly wheel 50. Sealing members 47 and 48 are disposed between the reduced diameter end portions 51 and 52 of the fly wheel 50 and the second cylinder 20 to form the sealed space 46. More specifically, the sealing member 47 is disposed between the inner circumference of an inner flange 28 provided in the second cylinder 20 and the reduced diameter end portion 51 of the fly wheel 50, and the sealing member 48 is disposed between the cover member 22 and the reduced diameter end portion 52 of the fly wheel 50. The inner circumferential wall of the second cylinder 20 and the outer circumferential wall of the fly wheel 50 constituting the sealed space 46 are provided close to each other as possible. The sealed space 46 is thus formed to have a small volume.

The sealing member 48 and the reduced diameter end portion 52 plug one of ends (on the right side in FIG. 1) of the second cylinder 20.

The sealed space 46 is filled with a viscous magnetic fluid 49. The viscous magnetic fluid (MR fluid) is composed of a base oil and magnetic particles suspended therein. Under a magnetic field, the magnetic particles form a chain-like structure which provides resistance force when the viscous magnetic fluid 49 deforms by shear force or flows. The strength of the resistance force changes according to the magnitude of the magnetic field. Under a certain magnitude of a magnetic field, the resistance force increases as the magnetic field increases. Since the sealed space 46 of the damping device 1 has a small volume, a required volume of the viscous magnetic fluid 49 is small compared to a conventional type which seals a viscous magnetic fluid in a cylinder.

A magnetic field generating unit 60 is disposed on the inner wall of the second cylinder 20. The magnetic field generating unit 60 is an electromagnet which generates a magnetic field M running across the sealed space 46 with the second cylinder 20 and the fly wheel 50 serving as a part of a magnetic circuit. The damping device 1 is configured such that, the shear deformation of the viscous magnetic fluid 49 in the sealed space 46 under the magnetic field M, produces a resistance acting on the fly wheel 50.

A generator rotating shaft 33 (rotating body) is coaxially coupled to the other end of the rotating shaft member 44. The generator rotating shaft 33 and the rotating shaft member 44 are coupled with a joint so as not to rotate relative to each other.

The generator 32 includes a rotor part (field magnet) including a plurality of permanent magnets which integrally rotate with the generator rotating shaft 33 and a stator part (armature) which includes a plurality of coils provided to face the outer circumference of the rotor part without contact and is disposed concentrically with the rotor part.

The generator 32 integrally rotates with the generator rotating shaft 33, and a plurality of permanent magnets provided on the rotor part rotates to generate a rotating magnetic field. Along with the rotation, the magnetic flux passing through a plurality of coils provided to face the outer circumference of the rotor part without contact changes, thereby generating an alternating-current power.

The illustrated generator 32 is a direct-current generator (DC motor) which performs full-wave rectification of the generated alternating-current power using a diode bridge and smoothing of the resulting current using a capacitor to output a direct-current power. The direct-current power is supplied to the magnetic field generating unit 60. More specifically, a positive terminal of the generator 32 is connected to one end of a coil 61 (see FIG. 3), which will be described later, of the magnetic field generating unit 60, and a ground terminal of the generator 32 is connected to the other end.

The generator 32 may be configured with an armature provided as a rotor part and a field magnet provided as a stator part.

Figure 3:
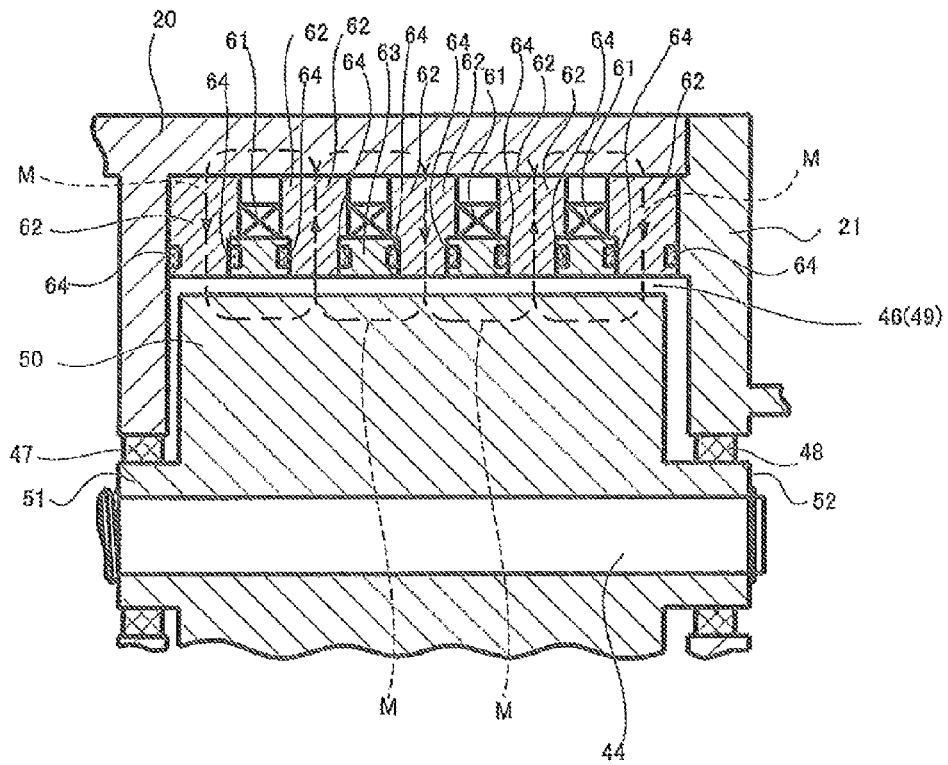
FIG. 3 is an enlarged cross-sectional view illustrating an essential portion of the damping device in FIG. 1.

The magnetic field generating unit 60 will be described below. FIG. 3 is an enlarged cross-sectional view illustrating an essential portion of the damping device according to the embodiment. The magnetic field generating unit 60 includes a plurality of, four for example, coils 61 disposed in parallel in the inner circumference of the second cylinder 20, yoke members 62 made of ferrite material, for example, which are disposed at both ends of the coil 61 to induce lines of magnetic force, a non-magnetic member 63 which is made of a material not allowing the lines of magnetic force to run therethrough, such as stainless steel, and disposed radially inside the coil 61 between yoke members 62, and a sealing member 64 which provides sealing of the viscous magnetic fluid between the yoke members 62 and the non-magnetic member 63.

In the magnetic field generating unit 60, the coils 61 are configured such that, when a current is applied to each coil 61, adjacent magnetic fields M run in the same direction and the lines of magnetic force run through the second cylinder 20 and the magnetic field generating unit 60 serving as a part of a magnetic circuit. Thus, the number of component members required to generate the magnetic field M, running across the sealed space 46, with the magnetic field generating unit 60 can be reduced. Since the members through which the lines of magnetic force run are made of a ferromagnetic material except the sealed space 46, the magnetic field M running across the sealed space 46 can be generated with high efficiency, which means that a strong magnetic field can be generated with low electric power consumption. Furthermore in the example, since the inner circumferential surface of the second cylinder 20, or the magnetic field generating unit 60, and the outer circumferential surface of the fly wheel 50 are provided close to each other, the magnetic field M can efficiently be generated in the sealed space 46. Since the resistance of the viscous magnetic fluid 49 increases as the thickness of the viscous magnetic fluid 49 decreases, a greater resistance acts on the fly wheel 50.

In the damping device 1, when the attachment member 41 and the universal joint 23 on both ends are vibrated, the linear motion component (the motion component of the ball screw 43 along the axial direction) of the vibration is efficiently converted into a rotational motion by the ball nut 42 and the ball screw 43 to rotate the fly wheel 50 and the generator rotating shaft 33. The direct-current power of the generator 32 generated by the rotational motion is supplied to the coil 61 of the magnetic field generating unit 60. That is, the whole electric power required for the magnetic field generating unit 60 is supplied from the electric power generated by the generator 32. When a current flows in the coil 61 of the magnetic field generating unit 60, the magnetic field M runs across the viscous magnetic fluid 49 in the sealed space 46 to chain the magnetic particles in the viscous magnetic fluid 49 between the magnetic field generating unit 60 and the fly wheel 50. The chain of magnetic particles is sheared by the rotation of the fly wheel 50, thereby applying resistance to the fly wheel 50.

Therefore, the vibration transmitted to the damping device 1 is effectively damped by the moment of inertia of the fly wheel 50 and the resistance of the viscous magnetic fluid acting on the rotating fly wheel 50. The resistance of the viscous magnetic fluid acting on the fly wheel 50 changes with the change in the current impressed on the coil 61 of the magnetic field generating unit 60. In the embodiment, under a stronger vibration transmitted to the damping device 1, the generator 32 generates a greater electric power, and a greater current is impressed on the coil 61. Thus, a damping force corresponding to the magnitude of the vibration can be provided.

By using the generator 32 as the power source of an electromagnet constituting the magnetic field generating unit 60, the magnetic field can be generated without any external power source to provide viscosity to the viscous magnetic fluid 49. Therefore, when the damping device 1 is vibrated, the effect of facilitating the damping of vibration by the viscous magnetic fluid 49 can be maintained. In this manner, the vibration can efficiently be damped with a simple configuration.

To prevent burning of the coil 61 caused by increased amount of electric power generated by the generator 32, a constant current circuit may be provided between the generator 32 and the coil 61 as an overcurrent protective device.

The amount of current supplied to the coil 61 of the magnetic field generating unit 60 can be changed according to the power-generating capacity (power-generating ability) of the generator 32. Thus, the strength of the magnetic field acting on the viscous magnetic fluid 49 can be changed according to the power-generating capacity of the generator 32 to set the resistance force which acts on the fly wheel 50 produced by shear flow to any magnitude, and thereby the damping force can be adjusted.

When the number of coils 61 is increased to obtain a large damping force, the generator 32 which has a power-generating capacity corresponding to the number of coils 61 should be selected. The relationship between the electric power required to generate a magnetic field and the power-generating capacity of the generator 32 varies for operating conditions and is obtained by experiments.

As for the sealed space 46 in the damping device 1, the dimension between the magnetic field generating unit 60 disposed on the inner wall of the second cylinder 20 and the outer circumferential surface of the fly wheel 50 is desirably small enough to prevent settling of the sealed viscous magnetic fluid 49 by stirring the viscous magnetic fluid with the fly wheel 50 rotated by a steady vibration of the damping device 1 which is in use. For example, when the damping device 1 is used for a structure, such as a building structure, a constant vibration of the building structure transmitted from a passing vehicle slightly rotates the fly wheel 50 of the damping device 1. The slight rotation of the fly wheel 50 stirs the viscous magnetic fluid 49 in the sealed space 46 such that the deposited magnetic particles are mixed with the base oil, thereby enabling the viscous magnetic fluid 49 to exert its property. The dimension of the gap between the fly wheel 50 and the magnetic field generating unit 60 is determined by experiments because the dimension differs for actual conditions of buildings in which the damping device 1 is used.

Figure 4:
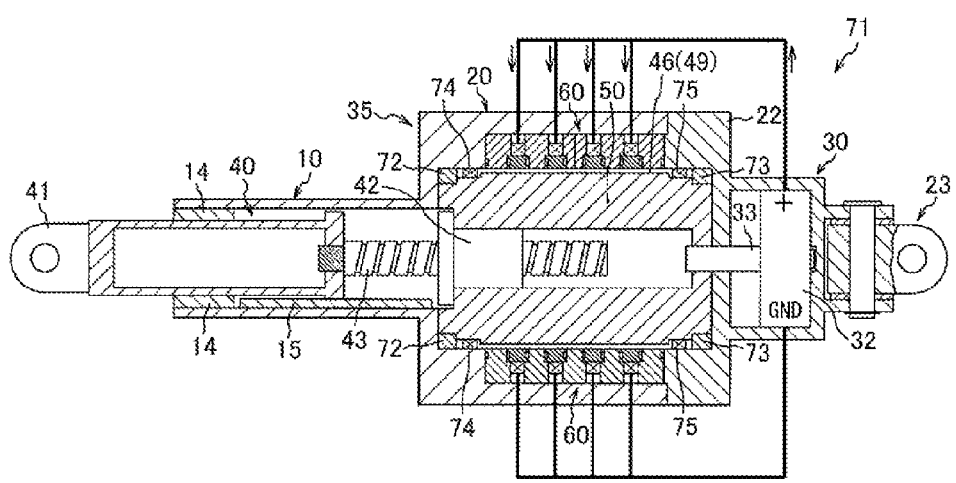
FIG. 4 is a cross-sectional view of a damping device according to a second embodiment.

Now, other damping devices according to embodiments of the present invention will be described. FIG. 4 is a cross-sectional view of a damping device according to a second embodiment. A component same as that of the first embodiment will be appended with the same reference sign.

In the damping device 71 according to the embodiment, the locations of the ball nut 42 and the ball screw 43 are interchanged from the first embodiment. The shape of an attachment member, for example, is changed from the first exemplary embodiment according to the change in locations of ball nut 42 and the ball screw 43. The rest of the configuration is same as the first exemplary embodiment.

The damping device 71 includes a casing 35 including a first cylinder 10, a second cylinder 20, and a third cylinder 30 and a sleeve 40 is disposed in the first cylinder 10 so as to reciprocate along the axial direction. One end of the ball screw 43 is coaxially fixed to a portion of the sleeve 40 closer to the second cylinder 20. The external thread of the ball screw 43 is screwed into the internal thread of the ball nut 42. The ball nut 42 is coaxially fixed to the central portion of the fly wheel 50 disposed in the second cylinder 20. The generator 32 is disposed in the third cylinder 30, and the generator rotating shaft 33 is coaxially connected to the central portion of the fly wheel 50.

With bearings 72 and 73 and sealing members 74 and 75 disposed between the outer circumference of both axial ends of the fly wheel 50 and the second cylinder 20, the second cylinder 20 rotatably supports the fly wheel 50, and a sealed space 46 is formed between the inner wall of the second cylinder 20 and the outer circumference of the fly wheel 50. The other end of the second cylinder 20 is plugged with the cover member 22.

A magnetic field generating unit 60 is disposed on the inner circumference of the second cylinder 20, and a viscous magnetic fluid 49 is sealed in the sealed space 46. The electric power generated by a generator 32 is supplied to each coil of the magnetic field generating unit 60.

The only difference between the damping device 71 according to the second embodiment and the damping device 1 according to the first embodiment is that the locations of the ball nut 42 and the ball screw 43 are interchanged. Thus, the damping device 71 according to the second embodiment provides the same effect as the damping device 1 according to the first embodiment.

Figure 5:
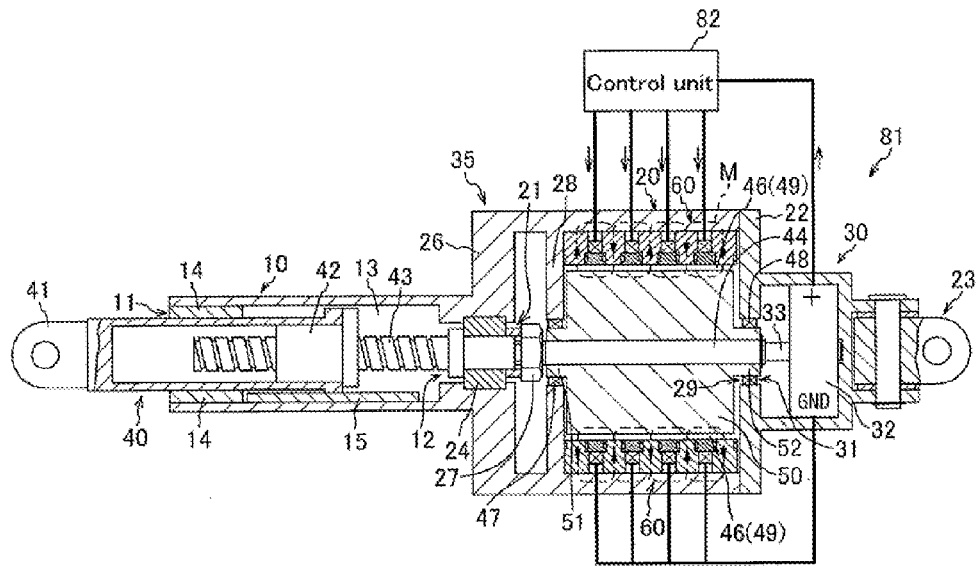
FIG. 5 is a cross-sectional view of the damping device according to a third embodiment.

Now, a damping device according to a third embodiment will be described. FIG. 5 is a cross-sectional view illustrating the damping device according to the third embodiment. The damping device 81 has the same configuration as the damping device according to the first embodiment except that the damping device 81 includes a control unit 82 between a generator 32 and a magnetic field generating unit 60.

The control unit 82 adjusts an impressed current on the magnetic field generating unit 60 of the damping device 81 according to the amount of electric power generated by the generator 32 to control the damping condition. For example, the control unit 82 may be configured such that when an amount of electricity generated by the generator 32 is of a certain threshold value or above, the electric power corresponding to the generated electricity amount is supplied to the magnetic field generating unit 60, and when an amount of generated electricity is below a certain threshold value, no electric power is supplied to the magnetic field generating unit 60.

As described above, the control unit 82 can change the impressed current on the coil of the magnetic field generating unit 60 to adjust the resistance of the viscous magnetic fluid acting on the fly wheel 50, and thus the damping property of the damping device 81 can be set as desired.

Figure 6:
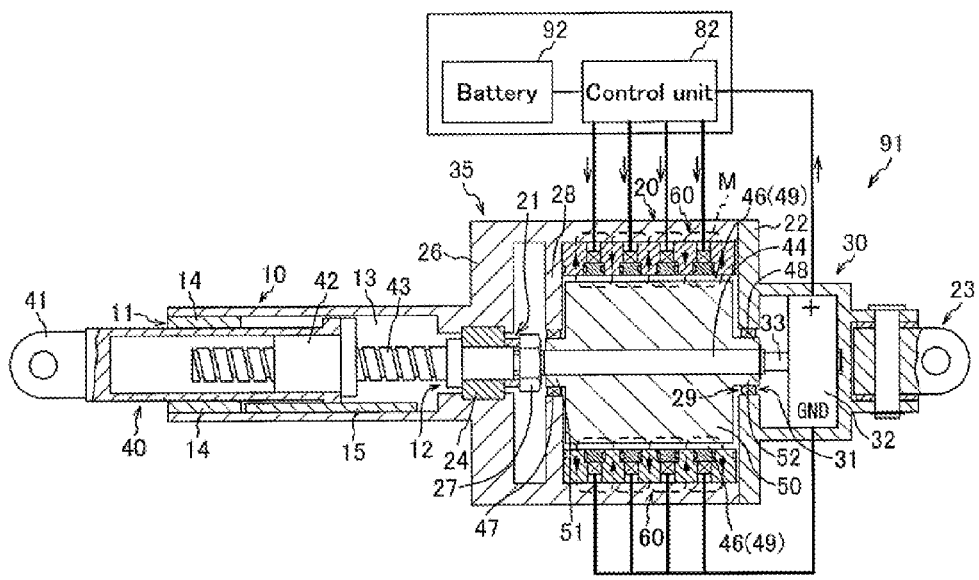
FIG. 6 is a cross-sectional view of the damping device according to a fourth embodiment.
Figure 7:
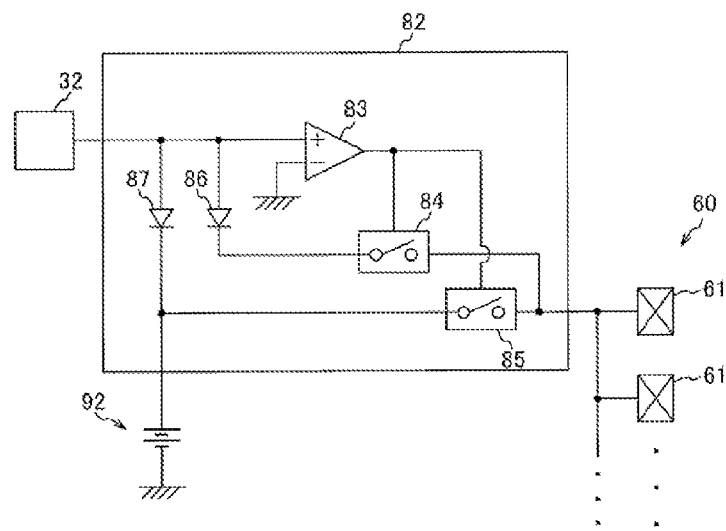
FIG. 7 is a view illustrating an example of a circuit configuration of a control unit.

Now, a damping device according to a fourth embodiment will be described. FIG. 6 is a cross-sectional view of the damping device according to the fourth embodiment. FIG. 7 illustrates an example of a circuit configuration of the control unit. The damping device 91 has the same configuration as the third exemplary embodiment described above except that the damping device 91 includes a storage battery 92 for temporarily storing the electric power generated by a generator 32.

As illustrated in FIG. 7, the control unit 82 includes a comparator which is turned on and off according to the voltage value of the electricity generated by the generator 32, a first switch element 84, and a second switch element 85, where the first and second switch elements are turned on when the comparator is turned on, and turned off when the comparator is turned off. The reference signs 86 and 87 are diodes for preventing a reverse current. The first switch element 84 determines whether to supply an electric power from the generator 32 to the coil 61, and the second switch element 85 determines whether to supply an electric power from the storage battery 92 to the coil 61.

In the control unit 82, when the electric power generated by the generator 32 is below a certain threshold value, the comparator 83 is in the off-state and therefore the first switch element 84 and the second switch element 85 are turned off, so that all the electric power generated by the generator 32 is supplied to the storage battery 92 via the diode 87. When the electric power generated by the generator 32 is of a certain threshold value or above, the comparator 83 is turned on and therefore the first switch element 84 is turned on, so that the electric power generated by the generator 32 is supplied to the coil 61 of the magnetic field generating unit 60. By turning on the comparator 83, the second switch element 85 is turned on, and the electric power in the storage battery 92 is supplied to the coil 61 of the magnetic field generating unit 60.

For example, when the damping device 91 is used in a structure, such as a building structure, a constant vibration of the building structure transmitted from a passing vehicle slightly rotates the fly wheel 50. In such case, an impressed current on the magnetic field generating unit 60 is not always necessary for controlling the vibration, so that all the electric power generated by the generator 32 may be supplied to the storage battery 92.

In contrast, when a strong vibration is applied to the building structure, the vibration should be damped quickly. In such case, it is possible that the electric power generated by the generator 32 using the rotation of the fly wheel 50 is not enough to provide a sufficiently impressed current on the magnetic field generating unit 60 to control the vibration. In such case, the storage battery 92 is discharged so that an electric power greater than the power-generating capacity of the generator 32 can be impressed on the magnetic field generating unit 60, and thereby the vibration can be damped quickly.

Figure 8:
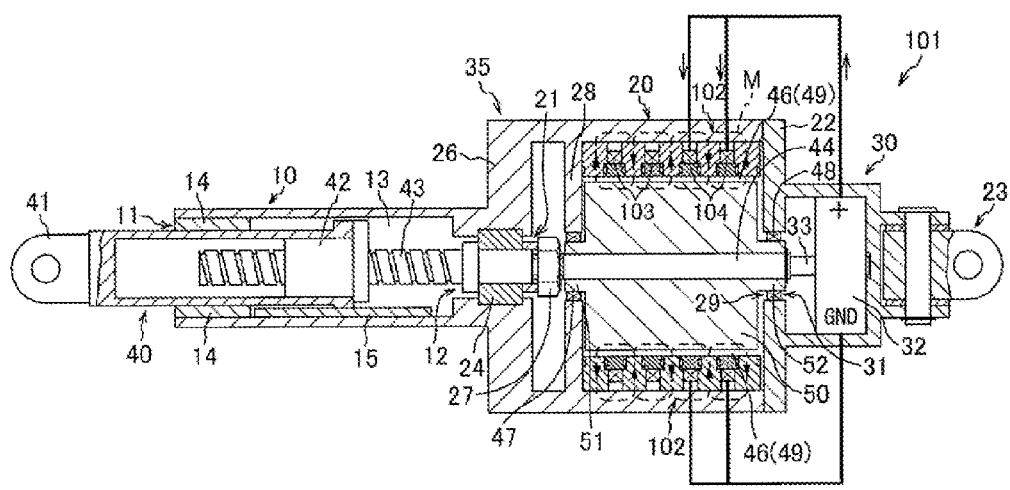
FIG. 8 is a cross-sectional view of the damping device according to a fifth embodiment.

Now, a damping device according to a fifth embodiment will be described. FIG. 8 is a cross-sectional view of the damping device according to the fifth embodiment. The damping device 101 includes a magnetic field generating unit 102 configured with a permanent magnet 103 and a coil 104. The rest of the configuration of the damping device 101 is same as the first exemplary embodiment described above. In the damping device 101, the permanent magnet 103 constituting the magnetic field generating unit 102 has a ring shape and is disposed inside the coil 104. The permanent magnet 103 constantly generates a magnetic field running across the sealed space 46. Therefore, magnetic particles in the viscous magnetic fluid form a chain-like structure to prevent deposition thereof. The damping device 101 is configured such that the total strength of the magnetic field M of the whole of the magnetic field generating unit 102 can be adjusted by adjusting the current supplied to a coil 104 to adjust the viscous resistance acting on the fly wheel 50. In this manner, an optimum vibration control property can be provided for an object of which vibration is to be controlled.

In the example illustrated in FIG. 8, the permanent magnet 103 and the coil 104 are arrayed along the rotation axis of the fly wheel 50. However, the permanent magnet 103 and the coil 104 may be disposed along the radial direction of the fly wheel 50 in a manner such that the magnetic flux generated by the coil 104 strengthen or weaken (cancel) the magnetic flux of the permanent magnet 103.

Figure 9:
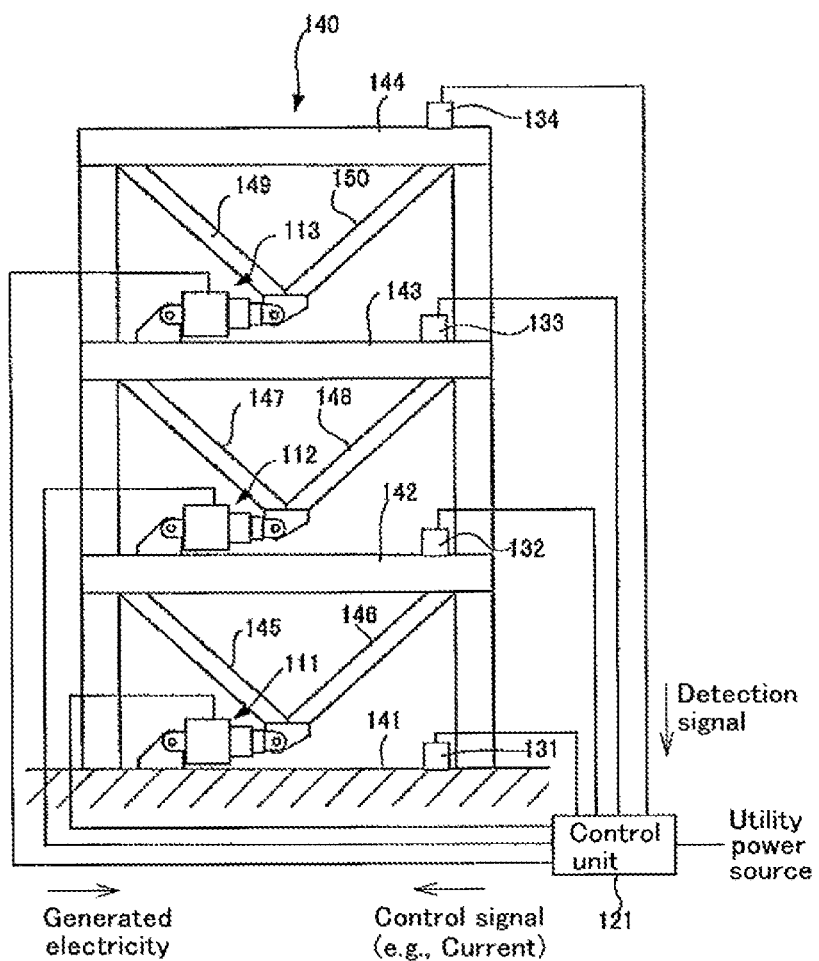
FIG. 9 is a schematic view illustrating a vibration control apparatus for a structure according to the embodiment of the present invention.

Now, an exemplary embodiment of the vibration control apparatus for a structure using the damping device according to the present invention will be described. FIG. 9 is a schematic view illustrating the vibration control apparatus for a structure according to the embodiment of the present invention. In this example, the damping devices according to the first, the second, or the fifth exemplary embodiment described above are installed in a building structure 140 to be controlled by a control unit 121. The control unit 121 performs control in the same manner as the control units according to the third and fourth embodiments except that a plurality of damping devices is controlled.

In the vibration control apparatus for a structure according to the embodiment, the damping devices 111, 112, and 113 are coupled, at one end thereof, to a ground 141 and structural members 142 and 143, respectively, and the damping devices 111, 112, and 113 are coupled, at the other end thereof, to coupling members 145 and 146, 147 and 148, and 149 and 150, respectively. Accelerometers 131, 132, 133, and 134 are mounted on the ground 141 and the structural members 142, 143, and 144. According to values detected by the accelerometers 131, 132, 133, and 134, the control unit 121 adjusts impressed currents on the magnetic field generating units of the damping devices 111, 112, and 113 to control the damping condition.

The control unit 121 may be connected to a storage battery described in the fourth embodiment. The control unit 121 may be connected to a utility power source so that when the utility power source is normally operating, the electric power can be supplied from the utility power source to the control unit 121, and when the utility power source is cut, the electric power generated by the generators of the damping devices 111, 112, and 113 and the electric power discharged from the storage battery may be supplied to the control unit 121.

According to the example, the damping forces of the damping devices 111, 112, and 113 can be changed according to the responding conditions of the ground 141 and the structural members 142, 143, and 144 detected by the accelerometers 131, 132, 133, and 134 to totally control the vibration of the building.

Figure 10:
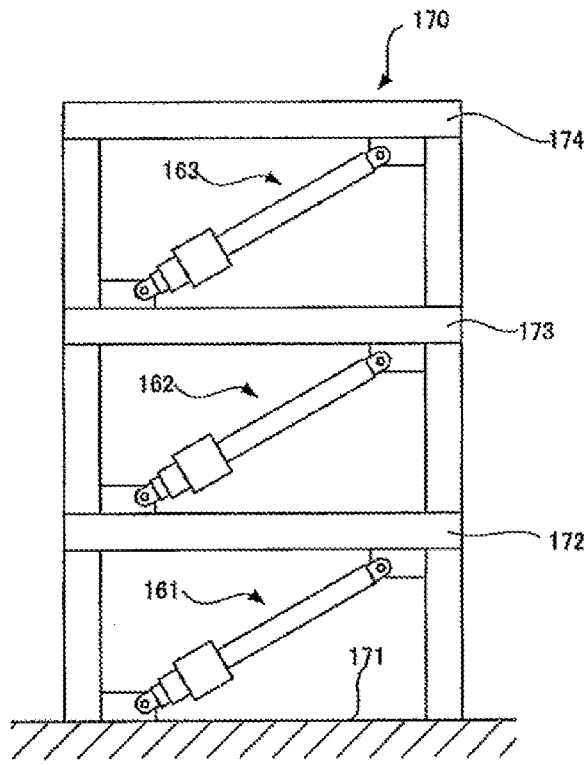
FIG. 10 is a schematic view illustrating an example of installation of the damping device of the vibration control apparatus for the structure according to the present invention.
Figure 11:
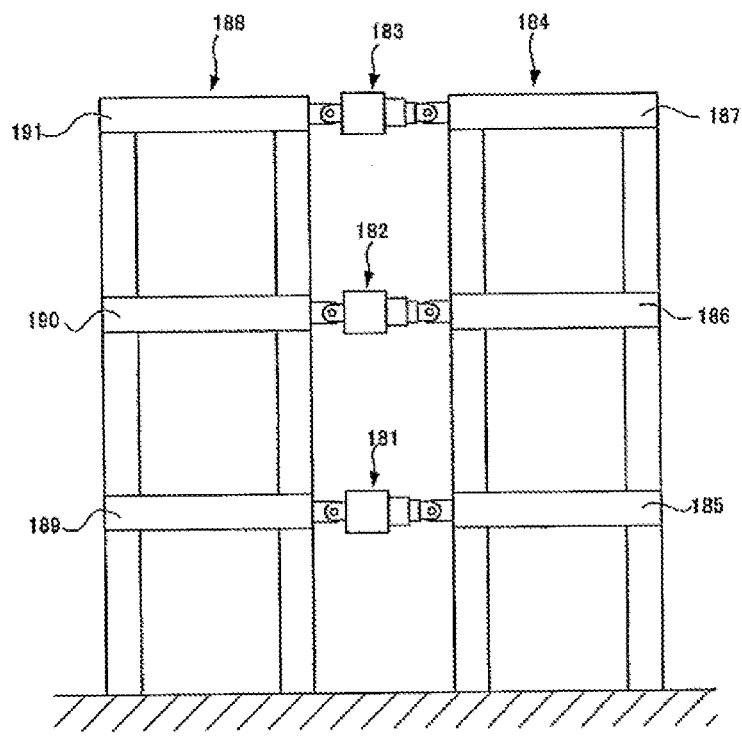
FIG. 11 is a schematic view illustrating an example of installation of the damping device of the vibration control apparatus for the structure according to the present invention.
Figure 12:
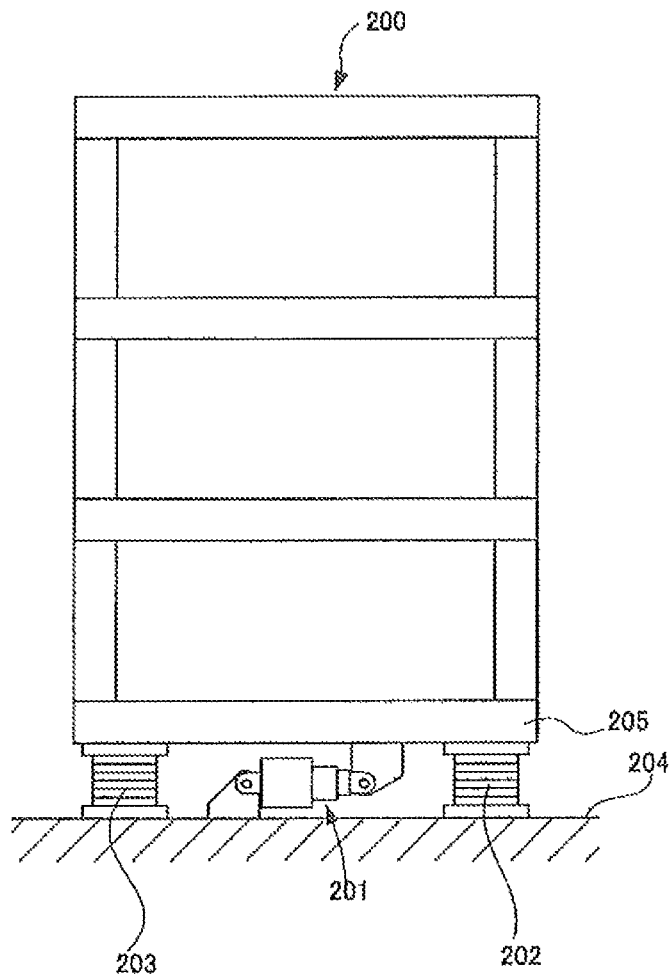
FIG. 12 is a schematic view illustrating an example of installation of the damping device of the vibration control apparatus for a structure according to the present invention.
Figure 13:
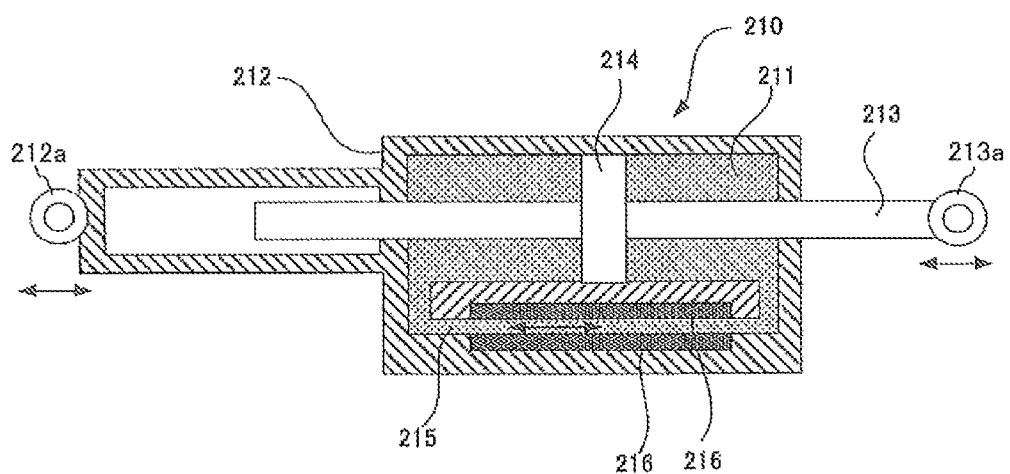
FIG. 13 is a cross-sectional view of an example of a conventional damping device.

The layout of arranging damping devices and accelerometers in a building structure may suitably be changed. FIGS. 10 to 12 are schematic views illustrating examples of the installation of damping devices of vibration control apparatuses for a structure. In each example, similarly to the previous example, each damping device is controlled by a control unit based on a value detected by an accelerometer mounted in the building structure.

In the example illustrated in FIG. 10, damping devices 161, 162, and 163 are installed to be braced across a ground 171 and structural members 172, 173, and 174 each constituting a floor of a building structure 170.

In the example illustrated in FIG. 11, damping devices 181, 182, and 183 couple structural members 185, 186, and 187 each constituting a floor of a building structure 184 with structural members 189, 190, and 191 each constituting a floor of a building structure 188, respectively.

In the example illustrated in FIG. 12, a damping device 201 is used for a quake-absorbing structure of a building 200. This example includes layered-rubber isolators 202 and 203 disposed between the building 200 and a ground 204, and the damping device 201 disposed between the ground 204 and a structural member 205 constituting the bottom-most layer of the building 200 as a vibration control apparatus of the structure.

In each of the examples, the control unit 121 controls the damping device according to the accelerometer mounted in the building structure. However, the control unit 121 can control the damping device according to external information on earthquake. Thus, the damping device can start operating according to external information on earthquake, in advance, to prepare the structure to damp a vibration before the arrival of an earthquake wave, which provides effective damping effect against an initial vibration.

According to the present invention, the control unit of the exemplary embodiment periodically operates the magnetic field generating unit to generate a magnetic field in the sealed space in the damping device. By operating the magnetic field generating unit to form magnetic particles in the viscous magnetic fluid in a chain-like structure, the deposition of the magnetic particles can be prevented. Thus, the vibration control apparatus can exert a predetermined vibration control property against a sudden seismic vibration.

REFERENCE SIGNS LIST

1 . . . damping device, 10 . . . cylinder, 11 . . . distal opening, 12 . . . Communication opening, 13 . . . axial through hole, 14 . . . bushing, 15 . . . key, 20 . . . cylinder, 21 . . . opening, 22 . . . cover member, 23 . . . universal joint, 24 . . . bearing, 26 . . . end flange, 27 . . . nut, 28 . . . inner flange, 29 . . . communication opening, 30 . . . cylinder, 31 . . . opening, 32 . . . generator, 33 . . . generator rotating shaft, 35 . . . casing, 40 . . . sleeve, 41 . . . attachment member, 42 . . . ball nut, 44 . . . rotating shaft member, 46 . . . sealed space, 47, 48 . . . sealing member, 49 . . . viscous magnetic fluid, 50 . . . fly wheel, 51, 52 . . . reduced diameter end portion, 60 . . . magnetic field generating unit, 61 . . . coil, 62 . . . yoke member, 63 . . . non-magnetic member, 64 . . . sealing member, 71 . . . damping device, 72 . . . bearing, 74 . . . sealing member, 81 . . . damping device, 82 . . . control unit, 83 . . . comparator, 84 . . . first switch element, 85 . . . second switch element, 86, 87 . . . diode, 91 . . . damping device, 92 . . . storage battery, 101 . . . damping device, 102 . . . magnetic field generating unit, 103 . . . permanent magnet, 104 . . . coil, 111, 112, 113 . . . damping device, 121 . . . control unit, 131, 132, 133, 134 . . . accelerometer, 140 . . . building structure, 141 . . . ground, 142, 143, 144 . . . structural member, 145 . . . coupling member, 161, 162, 163 . . . damping device, 170 . . . building structure, 171 . . . ground, 172, 173, 174 . . . structural member, 181, 182, 183 . . . damping device, 184 . . . building structure, 185, 186, 187 . . . structural member, 188 . . . building structure, 189, 190, 191 . . . structural member, 200 . . . building, 201 . . . damping device, 202, 203 . . . layered-rubber isolator, 204 . . . ground, 205 . . . structural member, 210 . . . damping device, 211 . . . viscous magnetic fluid, 212 . . . cylinder, 212a . . . attachment unit, 213 . . . piston rod, 213a . . . attachment unit, 214 . . . piston, 215 . . . bypass tube, 216 . . . magnetic field generating unit

The invention claimed is:
1. A damping device comprising:
a casing including a first cylinder and a hollow second cylinder, the first cylinder having an axial through hole having a distal opening at a distal end and a communication opening at the other end, the second cylinder being coaxially fixed to the other end of the first cylinder with an opening at one end of the second cylinder communicating with the communication opening, the other end of the second cylinder being plugged;
a hollow sleeve engaging in the distal opening of the first cylinder to be supported in the axial through hole so as to reciprocate along an axial direction without rotating;
a ball nut fixed inside the sleeve;
a ball screw screwed in an internal thread of the ball nut;
a fly wheel made of a ferromagnetic material, rotatably disposed in a hollow of the second cylinder, and coaxially fixed to the ball screw to be rotatably driven;
a sealing member forming a sealed space in a gap between an inner wall of the second cylinder and an outer circumference of the fly wheel;
a magnetic field generating unit disposed on the inner wall of the second cylinder and including an electromagnet configured to generate a magnetic field running across the sealed space with the fly wheel serving as a part of a magnetic circuit;
a viscous magnetic fluid sealed in the sealed space;

a generator including a rotor part configured to integrally rotate with the fly wheel and a stator part disposed concentrically with the rotor part, the rotor part being configured with a field magnet or an armature, the stator part being configured with an armature or a field magnet, and
a storage battery for storing an electric power generated by the generator, wherein
when the amount of the electric power generated by the generator is below a certain threshold value, the electric power generated by the generator is stored to the storage battery, when the amount of the electric power generated by the generator is of a certain threshold value or above, the electric power generated by the generator is supplied to the electromagnet.

2. A vibration control apparatus for a structure comprising:
the damping device according to claim 1 installed between structural members of a structure; and
a control unit for adjusting a magnetic force of a magnetic field generating unit of the damping device.

3. The vibration control apparatus for a structure according to claim 2 comprising an accelerometer for detecting vibration of the structure, wherein
the control unit controls the magnetic field generating unit according to a value detected by the accelerometer.

4. The vibration control apparatus for a structure according to claim 3, wherein
the accelerometer is mounted corresponding to the damping device, and
the control unit performs control according to a value detected by the accelerometer corresponding to the magnetic field generating unit of the damping device.

5. The vibration control apparatus for a structure according to claim 2, wherein the control unit controls the damping device according to external information on earthquake.

6. The vibration control apparatus for a structure according to claim 2, wherein the control unit periodically operates the magnetic field generating unit of the damping device to generate a magnetic field in the sealed space.

7. The damping device according to claim 1, wherein the other end of the second cylinder and the sleeve are each provided with a coupling part coupled to an external member.

8. The damping device according to claim 1, wherein the magnetic field generating unit includes a permanent magnet.

9. The damping device according to claim 1, wherein the magnetic field generating unit generates a magnetic field running across the sealed space with the second cylinder serving as a part of a magnetic circuit.

10. The damping device according to claim 1, wherein a dimension of the sealed space between the inner wall of the second cylinder and an outer circumferential surface of the fly wheel is suitable for preventing settling of a viscous magnetic fluid by stirring the sealed viscous magnetic fluid with the fly wheel rotated by a steady vibration of the damping device being used.

11. The damping device according to claim 1 comprising a control unit for adjusting a magnetic force of the magnetic field generating unit.

12. The damping device according to claim 1, comprising
a utility power source for supplying electric power to the electromagnet; wherein
when the utility power source is stopped, the electric power generated by the generator is supplied to the electromagnet.

13. A damping device comprising:
a casing including a first cylinder and a hollow second cylinder, the first cylinder having an axial through hole having a distal opening at a distal end and a communication opening at the other end, the second cylinder being coaxially fixed to the other end of the first cylinder with an opening at one end of the second cylinder communicating with the communication opening, the other end of the second cylinder being plugged;
a hollow sleeve engaging in the distal opening of the first cylinder to be supported in the axial through hole so as to reciprocate along an axial direction without rotating;
a ball screw fixed inside the sleeve;
a ball nut screwed on an external thread of the ball screw;
a fly wheel made of a ferromagnetic material, rotatably disposed in a hollow of the second cylinder, and coaxially fixed to the ball nut to be rotatably driven;
a sealing member forming a sealed space in a gap between an inner wall of the second cylinder and an outer circumference of the fly wheel;
a magnetic field generating unit disposed on the inner wall of the second cylinder and including an electromagnet configured to generate a magnetic field running across the sealed space with the fly wheel serving as a part of a magnetic circuit;
a viscous magnetic fluid sealed in the sealed space;
a generator including a rotor part configured to integrally rotate with the fly wheel and a stator part disposed concentrically with the rotor part, the rotor part being configured with a field magnet or an armature, the stator part being configured with an armature or a field magnet, and
a storage battery for storing an electric power generated by the generator, wherein
when the amount of the electric power generated by the generator is below a certain threshold value, the electric power generated by the generator is stored to the storage battery, when the amount of the electric power generated by the generator is of a certain threshold value or above, the electric power generated by the generator is supplied to the electromagnet.

14. A vibration control apparatus for a structure comprising:
the damping device according to claim 13 installed between structural members of a structure; and
a control unit for adjusting a magnetic force of a magnetic field generating unit of the damping device.

15. The vibration control apparatus for a structure according to claim 14 comprising an accelerometer for detecting vibration of the structure, wherein
the control unit controls the magnetic field generating unit according to a value detected by the accelerometer.

16. The vibration control apparatus for a structure according to claim 15, wherein
the accelerometer is mounted corresponding to the damping device, and
the control unit performs control according to a value detected by the accelerometer corresponding to the magnetic field generating unit of the damping device.

17. The vibration control apparatus for a structure according to claim 14, wherein the control unit controls the damping device according to external information on earthquake.

18. The vibration control apparatus for a structure according to claim 14, wherein the control unit periodically operates the magnetic field generating unit of the damping device to generate a magnetic field in the sealed space.

19. The damping device according to claim 13, wherein the other end of the second cylinder and the sleeve are each provided with a coupling part coupled to an external member.

20. The damping device according to claim 13, wherein the magnetic field generating unit includes a permanent magnet.

21. The damping device according to claim 13, wherein the magnetic field generating unit generates a magnetic field running across the sealed space with the second cylinder serving as a part of a magnetic circuit.

22. The damping device according to claim 13, wherein a dimension of the sealed space between the inner wall of the second cylinder and an outer circumferential surface of the fly wheel is suitable for preventing settling of a viscous magnetic fluid by stirring the sealed viscous magnetic fluid with the fly wheel rotated by a steady vibration of the damping device being used.

23. The damping device according to claim 13 comprising a control unit for adjusting a magnetic force of the magnetic field generating unit.

24. The damping device according to claim 13, comprising
    a utility power source for supplying electric power to the electromagnet; wherein
    when the utility power source is stopped, the electric power generated by the generator is supplied to the electromagnet.

\* \* \* \* \*